Aug. 11, 1964  L. W. SCHMIDT  3,144,083
PICK-UP WHEEL AND STRIPPER BAR UNIT FOR BEET HARVESTERS
Filed Jan. 21, 1963  2 Sheets-Sheet 1
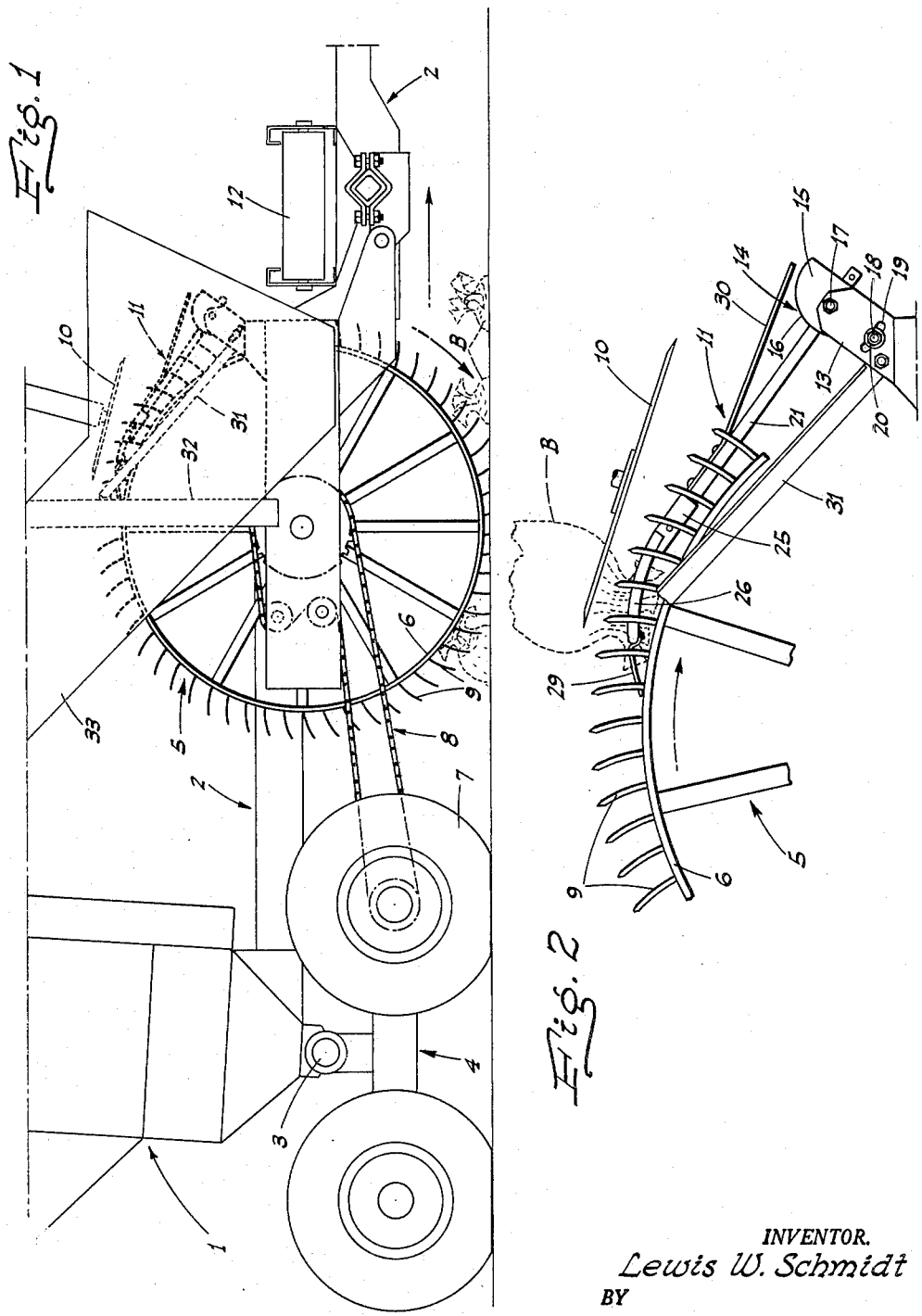
INVENTOR.
Lewis W. Schmidt
BY
Webster & Webster
ATTYS.

Aug. 11, 1964 L. W. SCHMIDT 3,144,083
PICK-UP WHEEL AND STRIPPER BAR UNIT FOR BEET HARVESTERS
Filed Jan. 21, 1963 2 Sheets-Sheet 2
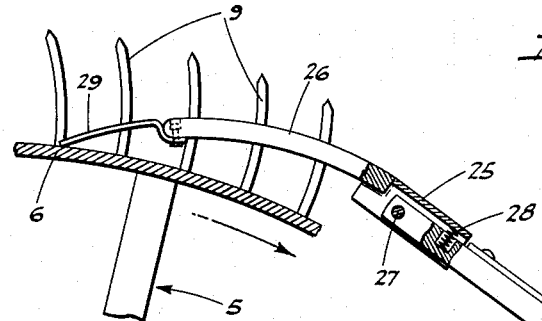
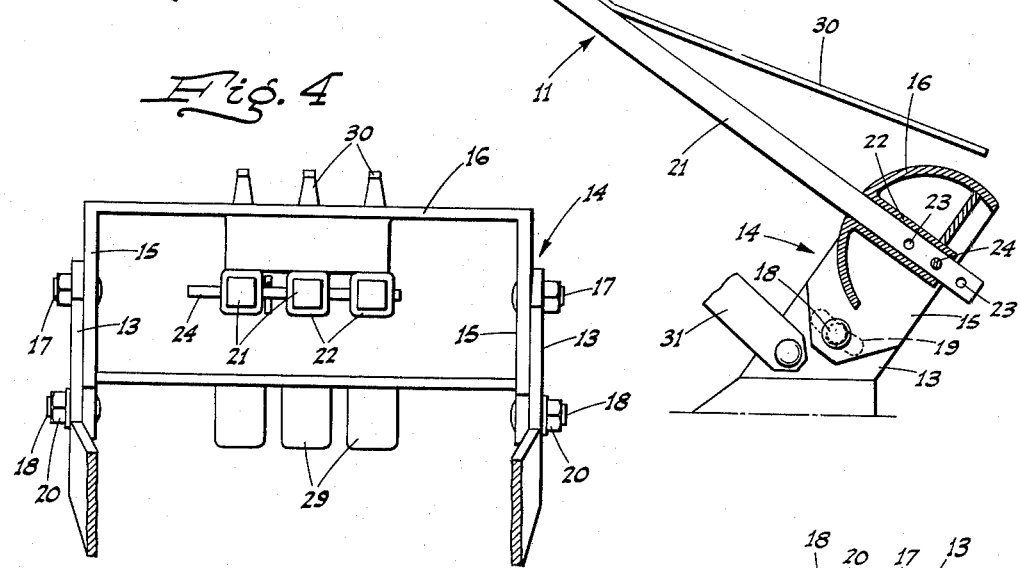
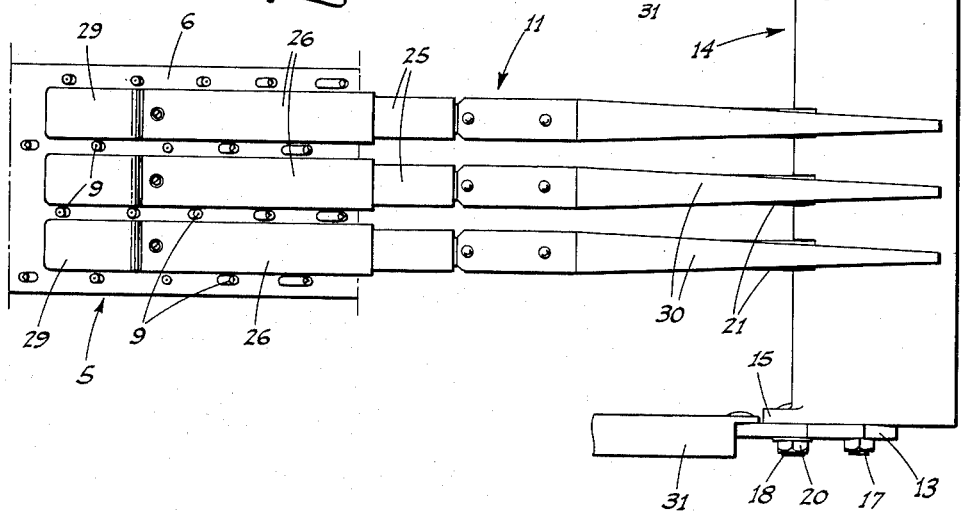

United States Patent Office 3,144,083
Patented Aug. 11, 1964

3,144,083
PICK-UP WHEEL AND STRIPPER BAR UNIT
FOR BEET HARVESTERS
Lewis Wallace Schmidt, Rio Vista, Calif., assignor of sixteen percent to Lloyd K. Schmidt, sixteen percent to Albert M. Jongeneel, ten percent to George C. Gordon, ten percent to Ernest F. Blackwelder, sixteen percent to Lewis W. Schmidt, sixteen percent to Claude A. Loucks, eight percent to Jessie Newell, and one and one-third percent each to Pliny G. Holt, Frank H. Holt, Richard E. Holt, Harriet H. Shelton, Frank A. Guernsey and Darius A. Guernsey
Filed Jan. 21, 1963, Ser. No. 252,635
1 Claim. (Cl. 171—39)

This invention relates to agricultural implements, and particularly to a beet harvester of that type which includes a spiked, beet pick-up wheel, a driven topping disc cooperating with the wheel to top the impaled beets after they have been lifted from the ground, and stripper means also cooperating with the wheel to strip the tops from such wheel after the disc has separated the tops from the beets themselves, and to discharge such tops from the harvester.

In connection with a beet harvester of the above noted type, it is a major feature of this invention to drive the pick-up wheel, and arrange the spikes thereon, in such a manner that the beets will become impaled on the spikes in a firmer and more positive manner than has heretofore been the case, while at the same time enabling the beets to be stripped from the spikes, after the topping operation has been completed, more easily and smoothly, and with less resistance, than was previously possible.

The top stripping means comprises, as usual, a number of stripper bars projecting between the rows of spikes on the pick-up wheel, and a further and important object of the invention is to construct and mount each stripper bar so that at its rear end such bar is yieldably but firmly pressed down against the rim-band of the wheel, and from which the spikes project, so that there is no chance for any foliage or the like to become lodged between the wheel band and the stripper bars.

Another object of the invention is to mount the stripper bars as a unit on the harvester in such a manner that they may be longitudinally adjusted relative to the wheel and to the topping disc as may be desirable for different conditions of operation, while at the same time enabling the rear ends of the bars to be maintained in their desirable wheel-band contacting relationship.

An additional object of the invention is to provide a practical, reliable, and durable pick-up wheel and stripper bar unit for beet harvesters, and one which will be exceedingly effective for the purpose for which it is designed.

These objects are accomplished by means of such structure and relative arrangement of parts as will fully appear by a perusal of the following specification and claim.

In the drawings:

FIG. 1 is a fragmentary side outline of a beet harvester of the spiked, pick-up wheel type, showing the improved spike positioning arrangement, and the stripper bar unit associated therewith.

FIG. 2 is an enlarged side elevation of the stripper unit shown in connection with a fragmentary portion of the pick-up wheel.

FIG. 3 is a further enlarged side view of the stripper unit as associated with the pick-up wheel, partly in section.

FIG. 4 is a front end view of the stripper unit, detached.

FIG. 5 is a top plan view of the stripper unit detached, but shown in connection with a fragmentary portion of the pick-up wheel.

Referring now more particularly to the drawings, and to the characters of reference marked thereon, a typical beet harvester of the spiked, pick-up wheel type, and indicated generally at 1, includes a longitudinal frame structure 2, adapted at its forward end for support and draft connection with the drawbar of a tractor (not shown). At its rear end the frame structure is pivoted, as at 3, on a ground engaging wheel truck 4. Mounted on the frame structure ahead of the truck 4 is the beet pick-up wheel 5, which includes a wide rim-band 6. This wheel is connected in driving relation with one of the front wheels 7 of the truck 4 by a chain drive unit 8. This unit is arranged to drive the wheel 5 in the same direction as the wheel 7, but at a lesser speed of rotation of the wheel band 6 than the linear speed of movement of the harvester along the ground, for the purpose which will be seen later.

The wheel band 6 is provided with a plurality of rows of somewhat closely spaced elongated spikes 9 which are curved on a large radius and, at the bottom of the wheel, are disposed in concavely facing relation to the front, while at the top of the wheel said spikes face to the rear, as will be obvious. The beets picked up by the spikes and elevated, by the rotation of the wheel, to the top thereof are topped in their then upside-down position by a rotary driven cutting disc 10 mounted on the harvester a short distance above the spikes and just ahead of the vertical center line of the wheel 5.

Cooperating with the rows of spikes which pass under the disc 10 is a stripper unit, indicated generally at 11, arranged to deliver the beet tops after they have been cut through onto a lateral carry-off conveyor 12 mounted on the frame structure 2 just ahead of the wheel 5. This unit 11 is constructed as follows:

Supported from the frame structure 2 on opposite sides of the wheel 5 at the front thereof are upstanding mounting plates 13. Extending between the plates 13 is a stripper supporting bracket 14 which includes plates 15 engaging the plates 13 and extending some distance above the same, and a curved hood 16 open to the front. The plates 15, and of course the bracket 14 as a whole, are pivoted on the plates 13 adjacent the top thereof, as at 17; the pivotal axis being preferably relatively close to the center of curvature of the hood 16.

Rotation and the consequent adjustment of the position of the bracket 14 is controlled by means of studs 18 projecting from the plates 15 through slots 19 in the plates 13 concentric with the pivots 17; the studs 18 having clamping nuts 20 on their outer ends.

Extending radially of the hood 16 and rearwardly therefrom are transversely spaced stripper standards 21, preferably of square form in section. These standards are slidably supported at their forward ends in sleeves 22 rigid with and inside the hood 16; these sleeves being disposed in such spaced relation that the standards 21 suported thereby will lie in transverse planes between the different rows of the spikes 9 of the wheel 5.

The sleeves 22 are also disposed so that said standards 21 will extend with an upward slope and generally tangentially but somewhat outwardly of the rim band 6 of the wheel, but radially inward—at their rear ends—of the outer ends of the spikes 9, as clearly shown. The standards 21, adjacent their forward ends, are each provided with a longitudinal row of transversely extending holes 23 adapted to selectively receive a retaining pin 24, common to all of the standards, which is detachably projected through a single set of aligned holes (not shown) through the sleeves 22, as indicated in FIG. 4.

At their rear ends, the standards 21 are disposed well under the topping disc 10, as shown in FIGS. 1 and 2, and each of which projects into an elongated channel-shaped saddle 25 which is rigid with, and projects forwardly from, a stripper bar 26. The standard 21 is transversely pivoted at its rear end to the saddle 25 adjacent its rear end, as at 27, and so that there is a slight space left between the top surface of the standard and the under side of the saddle, as shown. A compression spring 28 is seated on the standard 21 ahead of the pivot 27 and bears against the under side of the saddle 25, tending to tilt the latter upwardly about the pivot 27.

The stripper bars 26, which are of rectangular form in section, are longitudinally curved toward the wheel band 6, and each is of a width to project with a clearance fit between adpacent rows of spikes 9, as shown in FIG. 5. At it rear end each stripper bar is provided with a rearwardly extending replaceable spring finger 29, having substantially the same curvature and width as said bar, and bearing at its rear end on the wheel band 6 at a point near but slightly ahead of the vertical center of the wheel 5. Each stripper bar 26 is also provided, ahead of the saddle 25, with a deflector finger 30 which extends forwardly at an acute angle to the top surface of said bar to overlie the hood 16 in spaced relation thereto, as shown. To stiffen the bracket supporting plates 13, a diagonal brace 31 extends from each plate to a connection with an upright 32 (see FIG. 1) which forms part of the frame structure 2 at the corresponding side of the wheel 5.

In operation, upon the beet harvester 1 advancing, the truck wheel 7 turns in a forward direction and the pickup wheel 5 turns in the same direction but at a rim speed approximately one-third less than the linear or ground speed of the harvester. By reason of the fact that the wheel is turning at a relatively slow speed, said wheel at the bottom is in effect stationary relative to the ground for a short period. This feature, combined with the fact that the spikes 9 are curved contra to the direction of advance, causes the spikes 9 to be securely and cleanly jabbed into the beets B as the pick-up wheel 5 passes over the same with the advance of the harvester, rather than being merely pressed, somewhat at an angle, into the beets, as has heretofore been the case.

When the impaled beets reach the top of the wheel, the related spikes 9 face rearwardly, and the beets B are upended, as indicated in FIG. 2. The beets are then in position to be topped by the topping disc 10, and the beet tops are received on the stripper bars 26; the wheelband engaging fingers 29 assuring that the beet tops will not inadvertently pass under instead of over said stripper bars.

The spring 28 acts to keep the fingers 29—which are of hardened steel—in constant contact with the wheel band 6, so that there will be no chance of any foliage, dirt, etc., becoming wedged beneath the fiingers 29 and stripper bars 26 to possibly cause malfunctioning and subsequent damage to the stripper unit 11. The adjustability of the stripper standards 21 lengthwise enables the positioning of the stripper bars 26 and the fingers 29 to be altered relative to the topping disc 10, as may be found best for different conditions of operation, while the rotative adjustability of the standard suporting bracket 14 enables the fingers 29 of the different stripper bars 26 to be maintained in position for the necessary close engagement of said fingers with the wheel band 6, irrespective of the longitudinally adjusted position of the stripper standards 21 relative thereto.

From the foregoing description it will be readily seen that there has been produced such a device as will substantially fulfill the objects of the invention as set forth herein.

While this specification sets forth in detail the present and preferred construction of the device, still in practice such deviations from such detail may be restorted to as do not form a departure from the spirit of the invention, as defined by the appended claim.

Having thus described the invention the following is claimed as new and useful and upon which Letters Patent are desired:

In a beet harvester adapted to be drawn along the ground, a beet pick-up wheel having a rim band and elongated beet impaling spikes projecting from said rim band, the spikes having a longitudinal curvature concave, when at the bottom of the wheel, to the front; and means to rotate the wheel, as the harvester advances, in a direction to turn said rim band rearwardly at the bottom of the wheel at a predetermined speed lower than the linear speed of movement of the harvester along the ground, the harvester including a beet topping member at the top of the wheel above the spikes, the latter being disposed in transversely spaced rows, and a stripper unit to disengage the beet tops from the spikes and cooperating therewith; said unit including stripper bars projecting forwardly and downwardly from adjacent the top of the wheel between the rows of spikes, each bar including at its rear end a transversely flat rearwardly projecting finger which at its free end rides on the rim band, means mounting the bars as a unit on the harvester and comprising a bracket mounted on the harvester at the front of the wheel below the top level thereof, transversely spaced elongated standards mounted in the bracket and projecting upwardly and rearwardly generally tangentially of the wheel but spaced radially out from the rim band; the stripper bars at their forward ends being connected to the upper ends of the standards and curving downwardly toward the rim band so that the fingers contact the latter adjacent the top of the wheel; the connection of each bar with the related standard comprising a saddle rigid with and projecting forwardly from the forward end of the bar and into which saddle the upper end of the standard projects with a clearance fit, a transverse pivot connecting the saddle and standard, and a spring mounted on the standard ahead of the pivot and engaging the saddle and tending to swing the same upwardly at its forward end about said pivot as an axis.

References Cited in the file of this patent
UNITED STATES PATENTS

| | | |
|---|---|---|
| 1,571,344 | Sanders | Feb. 2, 1926 |
| 1,750,362 | Sanders | Mar. 11, 1930 |
| 2,350,173 | Loucks et al. | May 30, 1944 |
| 2,380,701 | Lea et al. | July 31, 1945 |
| 2,582,945 | Bingham et al. | Jan. 22, 1952 |